UNITED STATES PATENT OFFICE 2,337,172

HALOGENATED ALKYL CARBONATES AND PROCESS FOR PRODUCING THE SAME

Bruno H. Wojcik, Niagara Falls, N. Y., assignor to Hooker Electrochemical Company, Niagara Falls, N. Y., a corporation of New York No Drawing. Application May 21, 1941, Serial No. 394,495

4 Claims. (Cl. 260—463)

It is known that phosgene will react with alcohols to produce chlorcarbonates or carbonates, the latter being of course esters of carbonic acid. If the reagents are in equimolecular proportions, one chlorine atom of the phosgene will split off with the hydrogen of the OH group, producing a chlorcarbonate, as follows:

$$ROH + COCl_2 \rightarrow RO-COCl + HCl \quad (1)$$
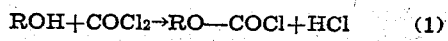

It is also known that if the reagents are in the proportion of two molecules of the alcohol to one of the phosgene, both chlorine atoms will split off with the hydrogen of two alcohol molecules, producing a carbonate, as follows:

$$2ROH + COCl_2 \rightarrow RO-CO-OR + 2HCl \quad (2)$$
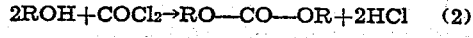

It is likewise known that the product of reaction (1) may be reacted with an equimolecular quantity of a different alcohol, producing what I call a "mixed" carbonate, as follows:

$$RO-COCl + R'OH \rightarrow RO-CO-OR' + HCl \quad (3)$$
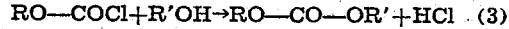

The R and R' of these reactions may be alkyl or aryl. The alcohols of reactions (1), (2) and (3) need not be anhydrous, but should be as nearly so as practical, as the presence of water results in waste of phosgene.

The products of these reactions have been tried for various purposes, such as the plasticizing of resins; but the compatibility of the aryl, and long chain dialkyl, mixed alkyl and aryl-alkyl products with most resins is unsatisfactory and the corresponding short chain products are too volatile to withstand the temperatures involved in working them into the resins. This is also generally true of all the chlorcarbonates. These latter compounds, besides being volatile, are unstable, and quite reactive. They are apparently related to the class of compounds known as "lachrymators."

Some of the diaryl carbonates, such as diphenyl carbonate, have been chlorinated to replace hydrogen in their carbon rings, but these compounds take up chlorine quite reluctantly. Except when they are mixtures of isomers, as in the case of dicresyl carbonate, for example, the chlorinated products are generally solids at ordinary temperatures. In any case, their compatibility with resins is unsatisfactory. These compounds also have an extremely pungent and unpleasant odor.

I have now discovered that the dialkyl and mixed alkyl chlorcarbonates and carbonates may be chlorinated very readily, and that some of them will take up as much as 70 per cent of their weight of chlorine. The chlorinated alkyl chlorcarbonates, like their unchlorinated originals, are unstable, reactive, volatile and lachrymatory. The chlorinated alkyl carbonates are fluids of good stability, colorless or nearly so, and of a consistency ranging from that of glycerine to that of chilled honey. The short chain products have the pleasant odor characteristic of esters. The long chain products are substantially odorless.

For present purposes I am therefore concerned with the chlorinated derivatives of alkyl carbonates only, and by this term I intend to designate not only the dialkyl carbonates of reaction (2) but also the mixed alkyl carbonates that may be produced by reaction (3), from monohydroxy or polyhydroxy alkyl alcohols.

To the best of my knowledge and belief, these products are new compositions of matter.

My new chlorinated dialkyl and mixed alkyl carbonates, as distinguished from the corresponding chlorcarbonates such as may be produced by reaction (1), have good heat and light stability, comparing favorably in this respect with the chlorinated paraffins.

My products are non-inflammable and flame resistant, and this is especially true of those of relatively high chlorine content. Thus, the products containing 45 per cent chlorine or higher cannot be made to burn even when a flame is played directly upon them. Some of the products containing less than 45 per cent chlorine can be made to char or burn by playing a flame upon them, but cease to burn instantly when the flame is removed.

My products are water insoluble, and since they resist oxidation some of them are useful as impregnating compositions for fibrous materials, such as fabrics, for water proofing, weather proofing, fire proofing, etc.

My products also have excellent dielectric properties and some of them are useful for impregnating fibrous electrical insulation.

Some of my products are suitable for coating air filters to trap dust. Their relative freedom from odor make them very suitable for this purpose. This is especially true of those of long chain.

My products are miscible with mineral lubricating oils up to very substantial proportions, such as twenty or thirty per cent or more, depending on the chlorine content. This is especially true of those of short chain. Since they contain chlorine, which is known to increase the film strength or load carrying capacity of such oils, and oxygen, which is known to increase their lubricity, and can be made neutral or nearly so, my products are valuable addition agents for such oils.

Many of my products are also compatible with a large number of natural and synthetic resins, in proportions sufficient to plasticize them, or, in other words, to modify their physical characteristics so as to convert the brittle resins to tough, strong solids or to flexible or elastic materials of the type known as "elastomers," all of which are useful for many purposes.

Among the short chain members of my group of products may be mentioned chlorinated diethyl carbonate and among the long chain members chlorinated dioctadecyl carbonate. The length of the chain is limited principally by the difficulty of forming the corresponding alcohols from long chain hydrocarbons.

Obviously these chlorinated dialkyl and mixed alkyl carbonates may be blended to produce compositions of special properties.

My chlorinated mixed alkyl carbonates, such as may be produced from two different alkyl alcohols in accordance with reaction (3), form useful groups of compounds with special properties that are susceptible of wide variation. Thus, if we start with a number of different alcohols and hook them up in all possible combinations we shall have a much greater number of products than the original number of alcohols. By mixing these diverse products, mixtures having greater fluidity than that of the separate components may be secured. Such mixtures may be superior for special purposes, and this is especially true when these materials are to be used as plasticizers.

The degree of chlorination of course affects the properties of these products and this can be varied within wide limits, up to a chlorine content of 50 or 70 per cent. The chlorine undoubtedly increases the compatibility of these carbonates with resins and especially with those containing chlorine, such as the polyvinyl chlorides, at least up to a certain point.

*Example I*

An effort was made to produce dimethyl carbonate by reaction of methyl alcohol with phosgene, but the reaction was found to be negligible.

*Example II*

An attempt was made to chlorinate diethyl carbonate at 105° C., but when the chlorine content had reached 55 per cent solids formed and sublimed into the condenser. By keeping the temperature range down to between 60° and 70° C. the chlorine content was carried to 69 per cent, corresponding to an average of 7.6 atoms of chlorine per molecule, as compared with a possible maximum of ten chlorine atoms per molecule. Upon cooling, white crystals developed and settled out, leaving an oily, colorless, volatile, supernatant liquid.

*Example III*

Dibutyl carbonate was heated to 105° C. and chlorinated, starting slowly to avoid loss of material with the evolved HCl, and finishing at 110° to 120° C. It was found to have a chlorine content of 68 per cent. The product was a water white, substantially tasteless and odorless fluid, of about the consistency of chilled honey and having a high surface tension. It showed a specific electrical resistance of 18,500,000 ohms. Heated to 140° C. for 16 hours, this material gave off 2.2 mg. of HCl per 1 gram of sample. This indicates excellent heat stability.

*Example IV*

Dibutyl carbonate was chlorinated in a manner similar to that of the preceding example, except that the chlorination was stopped when the chlorine content had reached 16.5 per cent, corresponding to monochlordibutyl carbonate. The product was a colorless, sweetish smelling liquid, having about the fluidity and volatility of kerosene oil.

*Example V*

Dibutyl carbonate was chlorinated as before until the chlorine content had reached 29.3 per cent, corresponding to dichlordibutyl carbonate. The product was substantially colorless, but still somewhat volatile.

*Example VI*

Dibutyl carbonate was chlorinated as before until the chlorine content had reached 38.4 per cent, corresponding to trichlordibutyl carbonate. The product was an oily, substantially colorless liquid, having a slight but pleasant odor.

*Example VII*

Di-n-amyl carbonate was chlorinated, starting at 80° C. and finishing at 115° C., when the chlorine content was found to be 55 per cent. The product was air blown at 95° C. It was a syrupy, substantially colorless, odorless fluid, of the consistency of fresh honey at ordinary temperatures.

*Example VIII*

Di-isoamyl carbonate was chlorinated as in the preceding example to a chlorine content of 52.8 per cent. The product was a thick, viscous, substantially colorless and odorless fluid, very similar to that of Example VII.

*Example IX*

Di-2-ethyl hexyl (dioctyl) carbonate was heated to 105° C. and chlorinated at 100° to 110° C. until it contained about 39 per cent chlorine, at which point the temperature began to drop, showing that the chlorine was being taken up less readily. The chlorination was discontinued and the product was air blown for about 1½ hours at 50° to 60° C. The product was a syrupy, slightly tinted, odorless and tasteless fluid. Its specific resistance, i. e., the resistance to flow of current between two electrodes 1 cm. square immersed in the material 1 cm. apart, was 3,192,000 ohms. Heated to 140° C., it evolved only 1.1 mg. of HCl per 1 gram of sample in 16 hours. This is considered evidence of excellent stability.

*Example X*

Dilauryl (didodecyl) carbonate was heated to 105° C. and chlorinated. When the chlorine content had reached 30 per cent of its weight of chlorine the reaction seemed to slow up and the chlorination was discontinued. The product was air blown for about one hour at 50° to 60° C. It was an oily, yellowish and nearly odorless fluid.

*Example XI*

Butyl-octyl carbonate was chlorinated at 100° to 125° C. up to a chlorine content of 40 per cent. The product was a nearly colorless, syrupy liquid.

The foregoing examples are given as typical only, and are not to be taken as a complete list of my new chlorinated esters of carbonic acid. Obviously many others will suggest themselves to persons skilled in the art. The following examples are given for comparison of the aryl with the alkyl products:

Example XII

Dicresyl carbonate was chlorinated at 100° to 110° C. to a chlorine content of 24.5 per cent. No more chlorine could be introduced without great difficulty. The product was a heavy, oily, vile smelling liquid, of a definite yellowish color, wholly unsuited to many of applicant's purposes.

Example XIII

An attempt was made to chlorinate diphenyl carbonate at 100° to 110° C. It would not take up the chlorine. The temperature was increased to 140° C. and then to 170° C. A catalyst was added. In this way chlorine was introduced to a content of 27 per cent. The product however, was a reddish brown solid and had a very unpleasant odor of phenol.

From the foregoing examples the following conclusions may be drawn:

(a) Under the conditions of the experiment, the limit of capacity of the long chain alkyl carbonates to take up chlorine, expressed as a percentage of their weight, is lower than that of the short chain alkyl carbonates.

(b) Short chain alkyl carbonates chlorinated to the limit of their capacity to take up chlorine are more viscous than long chain alkyl carbonates chlorinated to like degree.

(c) Chlorinated short chain alkyl carbonates are more volatile than chlorinated long chain alkyl carbonates containing the same proportion of chlorine and have more odor, but the odor is always pleasant.

(d) The long chain alkyl carbonates and the aryl carbonates require a higher temperature for chlorination and when chlorinated show more color than the short chain alkyl carbonates chlorinated to like degree.

(e) The chlorinated alkyl carbonate having 4 and 5 carbon atoms in their alkyl groups, including those of very high chlorine content, are substantially colorless and those having 40 to 70 per cent chlorine are likewise substantially odorless.

(f) The chlorinated alkyl carbonates of 4 and 5 carbon atoms when chlorinated to the limits of their capacity readily to take up chlorine are more viscous than any of the products that can be made from alkyl carbonates of a less or greater number of carbon atoms or from any aryl carbonates.

(g) Under the conditions of the experiment, the isomeric mixture diaryl carbonates, such as dicresyl carbonate, cannot be chlorinated to the viscosity beyond that of a medium lubricating oil and have a very disagreeable odor, precluding their use for many purposes, including all of applicant's purposes mentioned above.

(h) The diaryl carbonates that are substantially chemical individuals chlorinate with great difficulty to solid, highly colored products, of very unpleasant odor and limited compatibility with mineral oils and resins, and on these accounts useless for most of applicant's purposes.

I claim as my invention:

1. As new compositions of matter, the mixtures of substitution products resulting from the reaction of chlorine with organic carbonates of the general formulae $$RO-CO-OR \text{ and } RO-CO-OR',$$

in which R and R' represent alkyl radicals of four to twelve carbon atoms, the compositions, after removal of the by-product hydrogen chloride, containing substantially 16.5 to 68 per cent chlorine and being slightly tinted to substantially colorless, sweetish smelling to substantially odorless, and non-inflammable to flame-resistant, and ranging from oily liquids having about the volatility of kerosene to non-volatile fluids having about the viscosity of chilled honey, generally miscible with mineral oils and compatible with natural and synthetic resins.

2. As new compositions of matter, the mixtures of substitution products resulting from the reaction of chlorine with dibutyl carbonates, the compositions, after removal of the by-product hydrogen chloride, containing substantially 16.5 to 68 per cent chlorine and being slightly tinted to substantially colorless, sweetish smelling to substantially odorless, and non-inflammable to flame-resistant, and ranging from oily liquids having about the volatility of kerosene to non-volatile viscous fluids, generally miscible with mineral oils and compatible with natural and synthetic resins.

3. As new compositions of matter, the mixtures of substitution products resulting from the reaction of chlorine with diamyl carbonates, the compositions, after removal of the by-product hydrogen chloride, containing substantially 53 to 55 per cent chlorine and being slightly tinted to substantially colorless, substantially odorless, flame-resistant, viscous, syrupy fluids, generally miscible with mineral oils and compatible with natural and synthetic resins.

4. As new compositions of matter, the mixtures of substitution products resulting from the reaction of chlorine with dioctyl carbonate, the compositions, after removal of the by-product hydrogen chloride, containing substantially 39 per cent chlorine and being slightly tinted to substantially colorless, substantially odorless and tasteless, syrupy, flame-resistant fluids, of good stability and high dielectric properties, generally miscibles with mineral oils and compatible with natural and synthetic resins.

BRUNO H. WOJCIK.